(12) United States Patent
Durin-France et al.

(10) Patent No.: US 11,642,867 B2
(45) Date of Patent: *May 9, 2023

(54) PACKAGING SHEET, PACKAGING AND ASSOCIATED MANUFACTURING METHOD

(75) Inventors: Agnès Durin-France, Montelimar (FR); Donatien Coulon, Hommarting (FR); Jean-Jacques Provost, Barret (FR); Jean-Marie Nicolas Bonifacy, La Couronne (FR)

(73) Assignee: AMCOR FLEXIBLES FRANCE, Barbezieux Saint Hilaire (FR)

( * ) Notice: Subject to any disclaimer, the term of this patent is extended or adjusted under 35 U.S.C. 154(b) by 663 days.

This patent is subject to a terminal disclaimer.

(21) Appl. No.: 14/370,505

(22) PCT Filed: Jan. 6, 2012

(86) PCT No.: PCT/IB2012/000251
§ 371 (c)(1),
(2), (4) Date: Nov. 4, 2014

(87) PCT Pub. No.: WO2013/102785
PCT Pub. Date: Jul. 11, 2013

(65) Prior Publication Data
US 2015/0050414 A1 Feb. 19, 2015

(51) Int. Cl.
*B32B 3/26* (2006.01)
*B65D 85/76* (2006.01)
(Continued)

(52) U.S. Cl.
CPC ............... *B32B 3/266* (2013.01); *B26F 1/20* (2013.01); *B32B 23/08* (2013.01); *B65D 33/01* (2013.01);
(Continued)

(58) Field of Classification Search
CPC ..... Y10T 428/24331; Y10T 428/31895; Y10T 428/24942; Y10T 428/24347;
(Continued)

(56) References Cited

U.S. PATENT DOCUMENTS 4,861,632 A * 8/1989 Caggiano ............. B32B 7/02
428/35.2
4,977,031 A * 12/1990 Temple ............. B65D 81/264
426/126

(Continued)

FOREIGN PATENT DOCUMENTS

CA 2053707 A1 * 5/1992 ........... G06F 40/151
EP 0025431 A2 3/1981
(Continued)

OTHER PUBLICATIONS

Gotro, Jeffrey, Bio Polyethylene: Drop-in Replacement, Polymer Innovation Blog, published online at https://polymerinnovationblog.com/bio-polyethylene-drop-in-replacement/ on Mar. 11, 2013 (Year: 2013).*

(Continued)

Primary Examiner — Lee E Sanderson (57) ABSTRACT

Packaging sheet (1) intended for packaging a food product, in particular a cheese product, the packaging sheet (1) comprising:
an internal membrane (5) comprising at least one internal plastic layer (7) intended to be oriented towards the product to be packaged; and
a printable external surface (10), the external surface (10) being intended to be oriented away from the product to be packaged,
characterized in that the or each internal plastic layer (7) has a plurality of microperforations (8, 9) arranged in a random fashion on the or each internal plastic layer (7) in such a manner that the air per-
(Continued)

meability of the internal membrane (5) is comprised between 20 mL/min Bendtsen and 50000 mL/min Bendtsen.

13 Claims, 4 Drawing Sheets

(51) Int. Cl.
*B65D 33/01* (2006.01)
*B26F 1/20* (2006.01)
*B32B 23/08* (2006.01)

(52) U.S. Cl.
CPC .......... *B65D 85/76* (2013.01); *B32B 2250/02* (2013.01); *B32B 2250/24* (2013.01); *B32B 2307/724* (2013.01); *B32B 2317/18* (2013.01); *B32B 2318/02* (2013.01); *B32B 2439/70* (2013.01); *Y10T 428/24331* (2015.01)

(58) Field of Classification Search
CPC ....... Y10T 428/15; B32B 27/10; B32B 23/08; B32B 2250/24; B32B 2439/70; B32B 2307/724; B32B 7/00; B32B 7/02; B32B 3/26; B32B 3/266; B32B 3/30; B32B 2250/03; B65D 81/267; B65D 33/01; B65D 81/264; B65D 75/26; B65D 3/266; B65D 85/7376; B65D 85/73; B65D 85/76; B26F 1/20
USPC ......... 428/34.2, 34.3, 35.7, 34.6, 34.8, 35.2, 428/35.6, 35, 36.1, 36.2, 138, 131, 511; 156/87; 426/118, 127, 130, 582
See application file for complete search history.

(56) References Cited

U.S. PATENT DOCUMENTS

| | | | |
|---|---|---|---|
| 5,492,705 A | 2/1996 | Porchia | |
| 2003/0165663 A1* | 9/2003 | Christopherson | B32B 3/266 428/137 |
| 2004/0126531 A1* | 7/2004 | Harvey | B26F 1/24 428/43 |
| 2008/0277459 A1* | 11/2008 | Lenoir | B65D 75/20 229/87.5 |
| 2010/0221462 A1* | 9/2010 | Forsyth | B26F 1/24 428/34.1 |
| 2011/0189356 A1* | 8/2011 | Hanley | B65D 85/76 426/415 |

FOREIGN PATENT DOCUMENTS

| | | | | |
|---|---|---|---|---|
| EP | 0368602 A2 | 5/1990 | | |
| FR | 2531682 A1 | 2/1984 | | |
| FR | 2716174 A1 | 8/1995 | | |
| GB | 2355956 | 5/2001 | | |
| GB | 2355956 A | * | 5/2001 | ............... B32B 7/02 |
| WO | WO 01/04416 A1 | 1/2001 | | |

OTHER PUBLICATIONS

Ebnesajjad, Sine (ed.), Plastic Films in Food Packaging: Materials, Technology, and Applications, 2013, Williams Andrew, Oxford (Year: 2013).*
International Search Report and Written Opinion dated Sep. 21, 2012 in International Patent Application No. PCT/IB2012/000251.
European Search Report dated Dec. 13, 2013 in European Patent Application No. 13305946.9.

* cited by examiner

PACKAGING SHEET, PACKAGING AND ASSOCIATED MANUFACTURING METHOD

The present invention concerns a packaging sheet intended for packaging a food product, in particular a cheese product, the packaging sheet comprising:
- an internal membrane, comprising at least one internal plastic layer intended to be oriented towards the product to be packaged; and
- a printable external surface, the external surface being intended to be oriented away from the product to be packaged.

FR 2 716 174 discloses a packaging sheet for packaging cheese products, which comprises:
- an internal membrane formed of a layer of paper, which is coated with paraffin on its internal surface, i.e. on its surface intended to be oriented towards the packaged cheese product; and
- an external membrane, intended to be oriented towards the exterior of the package, i.e. away from the cheese product and made of a plastic material mixed with a water absorbing substance. The external plastic membrane is microperforated.

However, such a packaging sheet is not entirely satisfactory. Indeed, there is a direct contact between the packaged cheese product and the paraffin of the internal membrane, whose role is to prevent molds, and in particular the penicillium and/or geotricium, present on the cheese product, from growing on the paper of the internal membrane. Use of paraffin in the food packaging industry is being more and more frowned upon due to potential health issues stemming from its use. Therefore, it is desirable to avoid the presence of paraffin when developing packaging. Moreover, such a packaging sheet is not entirely satisfactory as concerns the control of the water and air flow through the packaging from the cheese product to the atmosphere.

One of the purposes of the present invention is to provide a packaging sheet which is adapted for packaging moisture sensitive food products, while at the same time avoiding the use of paraffin.

To this end, according to a first aspect of the invention, the or each internal plastic layer has a plurality of microperforations arranged in a random fashion on the or each internal plastic layer in such a manner that the air permeability of the internal membrane is comprised between 20 and 50000 mL/min Bendtsen, in particular between 15 and 2000 mL/min Bendtsen, and more particularly between 15 and 200 mL/min Bendtsen.

The random distribution of the microperforations results, where wanted, in a very uniform permeability and allows for a good control of the air and water exchanges through the packaging sheet.

The microperforations comprise through-holes extending through the or each internal plastic layer and blind-holes which open out on the internal surface of the innermost internal plastic layer.

This allows for a sufficient evacuation of the water in liquid and vapor state without drying out the cheese.

Other features of the packaging sheet according to the invention will be described hereafter.

The greatest dimension of the microperforations of the internal plastic layer in the plane of the internal plastic layer is comprised between 10 and 500 μm. Having microperforations with sizes in this range increases the duration of conservation of the packaged cheese product.

The internal membrane further comprises a first water-absorbing layer made of a first water-absorbing material. The first water-absorbing material is not a plastic material. It is therefore a non-plastic water-absorbing material.

A material is said to be water-absorbing if it has the ability of absorbing at least $0.2$ $g/m^2$ over one hour. The water-absorption rate is measured using the COBB test, which is well known in the art. The procedural standards used are the same as those explained in TAPPI T441 except for the duration of the test, which lasts one hour instead of 60 seconds as described in TAPPI T441.

The first water-absorbing material is a cellulose-based material. The first water absorbing layer is for example a cellulose film or a layer of paper.

The first water-absorbing layer retains the water transferred from the cheese product through the microperforations of the internal membrane. It acts as a buffer and prevents the dehydration of the cheese product. The presence of the first water-absorbing layer allows for an improved control of the rate of flow through the packaging sheet.

In this embodiment, the air permeability of the internal membrane is measured between the internal surface of the innermost internal plastic layer and the outer surface of the first water-absorbing layer.

The or each internal plastic layer is made of one of a petroleum-based plastic material, a plastic material derived from renewable sources or a mixture of a petroleum-based plastic material and a plastic material derived from renewable sources.

Petroleum-based plastic materials are plastic materials that are derived from petroleum. The petroleum-based plastic material is for example chosen among: polyethylene (PE), in particular low density polyethylene, linear low density polyethylene or metallocene, polyamide (PA), polypropylene (PP), polyester, ethylene methyl acrylate (EMA), ethylene butyl acrylate (EBA), ethylene acrylic acid (EAA) or a ionomer and their blends.

Plastic materials derived from renewable sources are plastic materials comprising carbons of renewable origin. These carbons are for example extracted from the biomass (e.g. from corn, wheat, soy or pine trees) or produced by microorganisms. The plastic materials derived from renewable sources are for example: polylactic acid (PLA), polyhydroxybutyrate (PHB) or their mixtures, polyhydroxyalkanoates (PHA) or blends of PLA with Mater-Bi® sold by the company Novamont.

Plastic materials derived from renewable sources are more environment-friendly than petroleum-based plastic materials since they derive from renewable resources rather than fossil resources. They further have the ability of retaining water and can therefore act as water-absorbing materials. Indeed, these materials have a COBB index value that is greater than $2$ $g/m^2$ over 24 hours. On the contrary, petroleum-based plastic materials are usually hydrophobic.

For example, the internal membrane comprises at least two superimposed internal plastic layers. In one embodiment, at least two of the internal plastic layers are made of different plastic materials. For example, the innermost internal plastic layer is made of a material that adheres poorly to the first water-absorbing layer and the outermost internal plastic layer is made of a plastic material that adheres well to the first water-absorbing layer. In this case, the outermost internal plastic layer promotes adhesion of the innermost internal plastic layer to the first water-absorbing layer. Providing different internal plastic layers made of different plastic material may also allow for adjusting the mechanical or chemical properties of the internal membrane depending on the different plastic materials used. In another embodiment, all the internal plastic layers are made of the same plastic material. Providing several superimposed internal plastic layers rather than one single internal plastic layer made in one piece also modifies the properties, e.g. the mechanical properties, of the internal membrane.

Optionally, the packaging sheet further comprises a second water-absorbing layer made of a second water-absorbing material. The second water-absorbing layer is superimposed on the first water-absorbing layer. The second water-absorbing material is not a plastic material. It is therefore a non-plastic water-absorbing material. The second water-absorbing layer provides additional water storage capacity. It is particularly useful for packaging very wet cheeses. Using a second water-absorbing layer also allows providing a first water-absorbing layer of lesser thickness for similar total absorption properties. In this embodiment, the permeability of the internal membrane is measured between the internal surface of the innermost internal plastic layer and the outer surface of the first water-absorbing layer. The second water-absorbing layer is not comprised in the internal membrane.

The second water-absorbing material is a cellulose-based material. The second water-absorbing layer is for example a cellulose film or a layer of paper.

In one embodiment, the internal membrane consists of the or each internal plastic layer. In this embodiment, the internal membrane does not comprise a water-absorbing layer as described above. In order to nevertheless confer water-absorbing properties to the internal membrane, at least one of the internal plastic layers, and more particularly at least the outermost internal plastic layer is made of a plastic material having water-absorbing properties. Example of plastic materials having water-absorbing properties are polyamide (PA), polyamide blended with other resins, plastic materials derived from renewable sources, such as PLA, PHB or resins blended with wood or starch fibres. In this embodiment, the permeability of the internal membrane is measured between the internal surface of the innermost internal plastic layer and the outer surface of the outermost internal plastic layer.

The internal plastic layer may have areas having different densities of microperforations. This feature allows tailoring the flow of water and air in a given area of the packaging sheet to the area of the food product, in particular the cheese product, it is intended to surround. It thus allows creating different functional areas on the packaging sheet. Different values of permeability are thus obtained in these different areas.

According to one embodiment, the packaging sheet further comprises an external layer which is at least partially bonded to the internal membrane, the external surface being formed by a surface of the external layer oriented away from the internal membrane. The external layer helps control the rate of desorption of the water from the water-absorbing layers towards the environment.

According to one embodiment, the external layer is only partially bonded to the internal membrane, for example along a set of bonding points, lines and/or graphic symbols. Adequate adhesives are for example a hotmelt adhesive, a pressure-sensitive adhesive or a water-based adhesive, such as a dextrin or a casein based adhesive. The adhesive is transparent or colored. A partial bonding between the external layer and the internal membrane allows for the needed evacuation of the water vapour comprised in the internal membrane.

In another embodiment, the external layer is bonded to the internal membrane along its entire surface facing the internal membrane. Adequate adhesives are waxes, such as petroleum-based waxes or waxes derived from renewable sources, pressure sensitive adhesives, water-based adhesives or adhesives comprising polyurethane, polyester, or polyurethane or polyester derivates.

The external layer is bonded to the internal membrane directly or indirectly e.g. through the second water-absorbing layer.

The external layer is for example a layer made of paper or of a plastic material among those cited above.

According to one embodiment, the external layer is a microperforated plastic layer. The microperforations are arranged in a random fashion and are obtained in the same way as the microperforations of the internal plastic layer. Alternatively, the external layer can be perforated in a different way, using needles for example. In this case, the perforations form a regular pattern, repeated over the external layer. The air permeability of the external layer is comprised between 0.1 and 80000 mL/min Bendtsen. This air permeability is in particular obtained through the presence of microperforations in the external layer. These microperforations allow for a good control of the diffusion of the water vapour through the external layer, which is desirable. Indeed, if the flow rate is too rapid, the first water-absorbing layer will dry out quickly and suck more humidity from the cheese resulting in a drying out of the packaged cheese. On the contrary, a flow rate that is too slow may result in a degradation of the cheese flora, the formation of condensation on the internal surface or a deterioration of the packaging sheet, and in particular of the paper layers that are possibly present.

According to one embodiment, the air permeability of the external layer is greater than the air permeability of the internal membrane. Such a permeability gradient increases the speed of desorption of the water from the water-absorbing layer. It is adequate for packaging sheets intended for packaging cheese products having a weight loss of about 3 to 8%, in particular of about 4 to 5%.

According to another embodiment, the air permeability of the external layer is smaller than the air permeability of the internal membrane. Such a permeability gradient reduces the flow of air and water through the external layer from the water-absorption layer to the environment. It is advantageous for cheese products having a weight loss during maturation smaller than 2.5%, more particularly smaller than 1.5%, or when it is desirable to promote the retention of the water in the water-absorbing layer, rather than its desorption from this layer.

In one embodiment, the internal plastic layer and the external layer both have areas having different densities of microperforations.

The density of microperforations in a given area on the internal plastic layer is for example chosen in relation with the density of microperforations in an area on the external layer facing the given area of the internal plastic layer. Choosing the density of microperforations of the external layer as a function of that of the internal plastic layer allows for an even better control of the flow of air and water through the packaging sheet from the packaged product to the environment. This allows selectively slowing or accelerating the maturation of the packaged product, in particular the packaged cheese product in certain areas depending on the relative distribution of the microperforations in these areas.

According to one embodiment, the internal plastic layer and the external layer both consist of a plastic material derived from renewable sources, the plastic material derived from renewable sources comprising for example polylactic acid or polyhydroxybutyrate. This combination of materials is particularly environment-friendly, since only materials derived from renewable sources are used.

In one embodiment, the external surface is formed on the internal membrane. According to one more particular embodiment, the packaging sheet is in the form of a single sheet. "Single sheet" means that the different layers are formed onto one another for example by extrusion of one layer onto another, rather than being formed separately and later adhered to one another. A packaging sheet in the "single-sheet" form is advantageous since its production cost is reduced compared to a "multisheet" packaging sheet.

The invention also relates to a packaging comprising the packaging sheet as described above and a food product, in particular a cheese product, arranged in the packaging sheet in such a way that the internal plastic layer is oriented towards the food product.

In one embodiment, the packaging sheet is folded around the food product. The packaging sheet is not sealed to itself in a gas tight fashion. In another embodiment, the packaging sheet is sealed to itself, typically along a weld line, in a gas tight fashion. It creates a gas tight chamber where the food product is received. The packaging sheet is for example a flow pack in this case.

The invention also relates to a method for manufacturing a packaging sheet as described above, comprising the successive steps of:

providing an internal membrane, comprising at least one internal plastic layer intended to be oriented towards the product to be packaged; and forming simultaneously on the or each internal plastic layer a plurality of microperforations arranged in a random fashion on the or each internal plastic layer in such a manner that the air permeability of the internal membrane is comprised between 20 and 50000 mL/min Bendtsen.

The features of the invention will be apparent from the following description with reference to the accompanying drawings wherein.

The packaging sheet according to the invention is intended for packaging food products, such as for example cheese, vegetables, cooked or raw meat or meat-containing products, cooked or raw fish or fish-containing products, dishes containing fish or meat or backed goods, such as cookies or cakes.

It is particularly adapted for packaging a moisture-sensitive product, the packaging controlling the moisture and/or the exudates originating from the product after it has been packaged.

The packaging sheet according to the invention is also adapted for use in an oven or in a micro-wave oven, for example as a micro-wave foil or as an oven foil. For this application, it is made of materials that resist to temperatures up to 220° C., more particularly between 80° C. to 155° C. This means that the material of the packaging sheet is not degraded at these temperatures. In particular, it does not melt, disintegrate or burn at these temperatures. The fat and the water vapor from the food wrapped in the packaging sheet can flow through the packaging sheet towards the environment during cooking. This advantage in particular results from the particular distribution of microperforations on the internal plastic layer.

In this case, the food product may be a cheese product, or another type of food product that has to be heated before being eaten.

The internal membrane in this case includes typically an internal plastic layer made of polyester or polypropylene or polyamid, and a water-absorbing layer made of paper.

Figure 1:
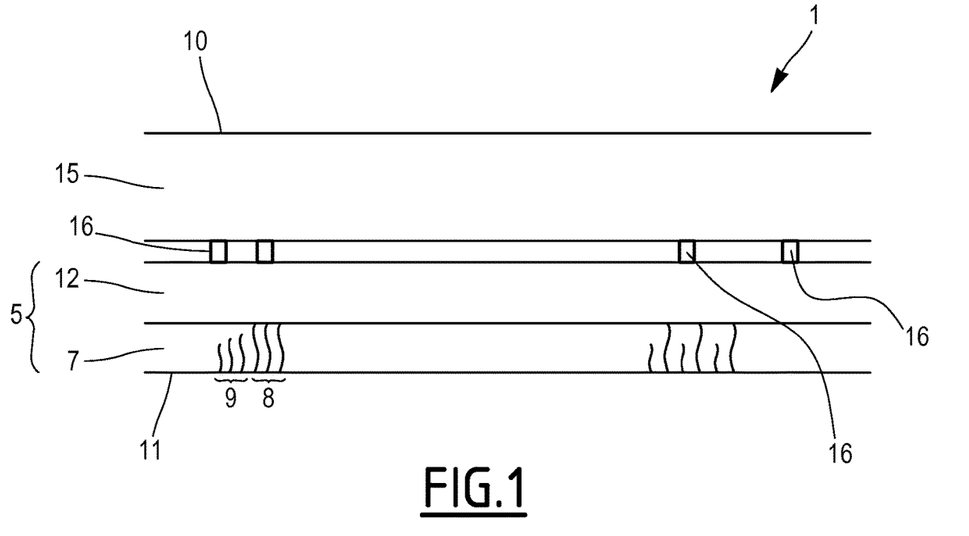
FIG. 1 is a diagrammatic cross-section of a packaging sheet according to a first embodiment of the invention.

A packaging sheet 1 according to a first embodiment of the invention is shown on FIG. 1. It comprises an internal membrane 5 intended to be oriented towards the product to be packaged. The internal membrane 5 is therefore intended to be on the inside of the finished package.

It also comprises an external surface 10, intended to be oriented away from the product to be packaged. The external surface 10 may be the outermost surface of the packaging sheet 1. However, the packaging sheet 1 may further comprise a layer of varnish and/or ink superimposed onto the external surface 10. The varnish is intended for protecting the external surface 10 against aggressions from the environment. It may also be used to provide a glossy aspect to the external surface 10. The external surface 10 is visible from the outside.

The external surface 10 is a printable surface. A printable surface is a surface that can be printed upon without the need of additional treatments, for example for increasing the adherence of the print on the surface. For example, a paraffin coated surface is not a printable surface.

The internal membrane 5 comprises an internal plastic layer 7. The internal plastic layer 7 is the layer of the internal membrane 5 that is intended to be oriented towards the product wrapped in the packaging sheet.

The internal plastic layer 7 has a plurality of randomly distributed microperforations. "Randomly distributed" in particular means that the distance between two adjacent microperforations, taken in the plane of the internal plastic layer 7, is not constant. At least over a surface of the internal layer 7 having an area substantially equal to that of the active surface of the tool used for making the microperforations, the microperforations do not define a pattern that is repeated periodically. Further, the shapes of the microperforations are variable. The dimensions of the microperforations in the plane of the internal plastic layer 7 are also variable from one microperforation to the other. This feature is illustrated on the diagrammatic representation of FIG. 2.

Figure 2:
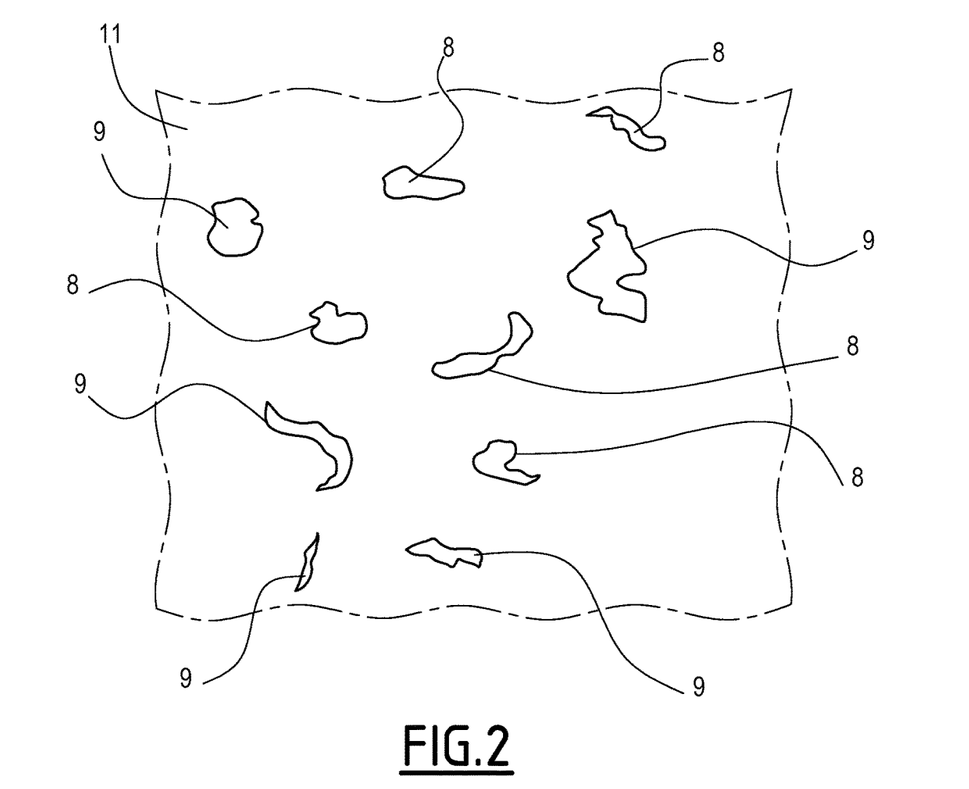
FIG. 2 is a diagrammatic plane view from below of the internal plastic layer of the packaging sheet shown in FIG. 1.

The greatest dimension of the microperforations of the internal plastic layer 7 in the plane of the internal plastic layer 7 is comprised between 10 and 500 µm, preferably between 10 and 250 µm, and more particularly between 10 and 150 µm. This means that the width of any microperforation taken along any direction comprised in the plane of the internal plastic layer 7 is smaller or equal to a maximum value comprised in the above mentioned ranges.

The length of the microperforations, taken in a transverse direction, perpendicular to the plane of the internal plastic layer 7, is also variable. Some microperforations 8 are through-holes that extend through the entire thickness of the internal plastic layer 7. Other microperforations 9 are blind-holes whose length is smaller than the thickness of the internal plastic layer 7. Each microperforation 9 of the latter type thus forms a recess or a cavity in the internal surface 11 of the internal plastic layer 7. As a whole, the microperforations confer microporosity to the internal plastic layer 7.

The presence of cavities or recesses on the internal surface 11 is particularly advantageous. Indeed, the internal surface 11 is the surface intended to be in contact with the cheese product wrapped in the packaging sheet 1. The cheese flora, and in particular the penicillium, can develop in these cavities, which has a very positive effect on the maturation of the cheese.

The microperforations may be obtained using a cylinder fitted with randomly distributed projections of different shapes and lengths, these projections being suitable for indenting or perforating the internal plastic layer 7. "Randomly distributed" in particular means that the distance between two adjacent projections is not constant. More particularly, the projections fitted on the cylinder do not define a pattern that is repeated periodically over the cylinder. The microperforations on the internal layer 7 are distributed randomly on the internal layer 7, i.e. in such a way that, at least over an area that is equal to that of the lateral surface of the cylinder, they do not define a pattern that is repeated periodically. A suitable tool is for example a cylinder fitted with diamond points.

The density of microperforations on the internal surface 11 of the internal plastic layer is high. It is in particular higher than 1500 microperforations per $dm^2$. The random distribution of the microperforations contributes to obtaining this high density of microperforations.

The microperforations are distributed on the internal plastic layer 7 in such a manner that the air permeability of the internal membrane 5 is comprised between 20 and 50000 mL/min Bendtsen. Advantageously, the air permeability of the internal membrane 5 is comprised between between 15 and 2000 mL/min Bendtsen, and more preferably between 15 and 200 mL/min Bendtsen.

The air permeability is measured using the method disclosed in the international standard ISO 5636-3. It is for example measured using the air permeance tester sold by the company Lorentzen & Wettre used in Bendtsen measure mode.

Although in the present specification, the air permeability ranges are expressed in mL/min Bendtsen and measured using the Bendtsen method, any other air permeability unit and corresponding method can be used for measuring the air permeability. In this case, the claimed and disclosed ranges should be converted from mL/min Bendtsen into these other units.

The air permeability of the internal membrane 5 can for example be modified by varying the pressure exerted by the tool, e.g. the cylinder, on the layer 7 to be microperforated.

The internal plastic layer 7 has areas having different densities of microperforations.

In another embodiment, all the areas of the internal plastic layer 7 have the same density of microperforations.

The internal plastic layer 7 for example has a weight per square meter comprised between 3 and 20 g, more particularly between 6 and 12 g, even more particularly between 10 and 12 g.

The zones in which the thickness of the internal plastic layer 7 is reduced due to the presence of microperforations are zones of preferred water vapour passage. The microperforations 8 which extend through the entire thickness of the internal plastic layer 7 allow the passage of air, water vapour and liquid water.

The distribution and shape of the microperforations described above is particularly advantageous. Indeed, the high density of micrometric perforations allows for a homogenous distribution of the exchange sites over the internal surface and therefore for a homogenous flow of air and water through the internal membrane.

On the contrary, when the perforations are made using needles that are regularly distributed on a cylinder, the resulting arrangement of perforations is regular and not random. The density of perforations is also much lower than with the microperforations according to the invention. Therefore, an internal layer which is perforated with needles presents localized surface areas of high flow of water or air through the internal membrane where the perforations are located and large areas of zero flow through the internal membrane between the perforations. The presence of such local areas in the internal membrane results in a degradation of the cheese flora. Thus, the absence of such localized surface areas which is achieved in the packaging sheet according to the invention is very advantageous for the maturation of the cheese.

This distribution of microperforations according to the invention also allows for a complete and rapid evaporation of the water originating from the cheese. Thus, the risk of formation of condensation on the inside of the packaging is significantly reduced.

In the embodiment shown on FIG. 1, the internal membrane 5 further comprises a first water-absorbing layer 12 made of a first water-absorbing material and superimposed on the internal plastic layer 7. The first water-absorbing material is for example a cellulose-based material, such as cellulose film or paper. Advantageously, the first water-absorbing layer 12 is a layer of paper. The first water-absorbing layer 12 is bonded to the internal plastic layer 7. In particular, the internal plastic layer 7 is extruded onto the first water-absorbing layer 12.

The internal plastic layer 7 provides support to the first water-absorbing layer 12, which is in particular a layer of paper and thus increases its wet strength. It is therefore possible to use for the first water-absorbing layer 12 paper of different quality or paper which has not been previously treated with wet-strength resin. Thus, the cost of the packaging sheet can be reduced as compared to FR 2 716 174.

The first paper layer 12 for example has a grammage of 20 to 40 g, and in particular a grammage of 32 to 40 g, more particularly of 32 g.

In the first embodiment, the packaging sheet 1 further comprises an external layer 15, which is at least partially bonded to the internal membrane 5. In this embodiment, the external surface 10 is formed by a surface of the external layer 15 intended to be oriented away from the packaged product.

The external layer 15 is adhesively bonded to the internal membrane 5. The external layer 15 is for example adhered only partially to the internal membrane 5. The adhesive is for example sprayed or coated onto one or both of the surfaces of the internal membrane 5 and of the external layer 15 intended to be bonded to one another. The adhesive may be transparent or coloured. The external layer 15 is for example adhered to the internal membrane 5 along a set of bonding points and/or lines 16. Adequate adhesives are for example a hotmelt adhesive, a pressure-sensitive adhesive or a water-based adhesive, such as a dextrin or a casein based adhesive.

The adhesive may also form a graphic symbol, such as a brand mark, a letter, a word or a drawing. In this case, the adhesive is chosen in such a manner that, when dry, it contrasts with the underlying and/or overlying layers. The graphic symbol formed by the adhesive is visible from the exterior and/or the interior of the package.

Figure 3:
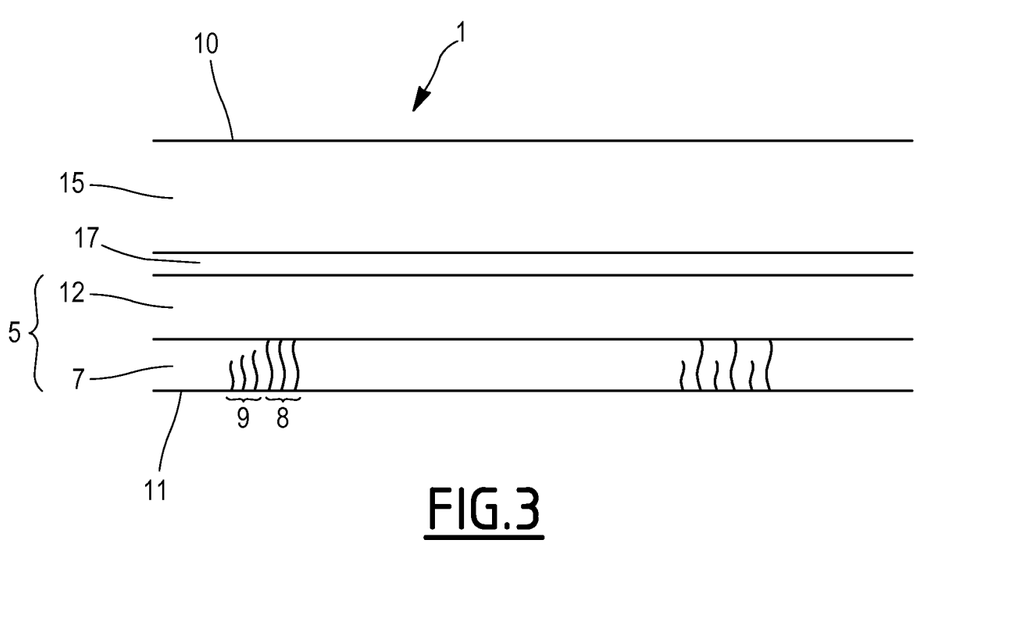
FIG. 3 is a diagrammatic cross-section of a packaging sheet according to an alternative of the first embodiment.

According to an alternative of the first embodiment shown in FIG. 3, the external layer 15 is bonded to the internal membrane 5 along its entire surface facing the internal membrane 5 ("full surface bonding"). The internal membrane 5 and the external layer 15 are for example adhered to one another along their entire facing surfaces using a layer of adhesive 17. Adequate adhesives are waxes, for example petroleum-based waxes or waxes derived from renewable sources, pressure sensitive adhesives, water-based adhesives or adhesives comprising polyurethane or polyurethane derivates. The adhesive may be coated or sprayed onto one or both of the entire facing surfaces of the internal membrane 5 and of the external layer 15. In another embodiment, the full surface bonding between the external layer 15 and the internal membrane 5 is obtained by extrusion laminating a layer of resin, for example of polyethylene, onto at least one of the facing surfaces of the internal membrane 5 and of the external layer 15.

In the case of a full surface bonding, the water-absorbing layer should have a higher water absorption capacity than in the case of a partial bonding in order to prevent water retention between the packaging sheet 1 and the packaged product.

The external layer 15 has a plurality of microperforations distributed in a random fashion. The microperforations are arranged in such a way that the air permeability of the external layer 15 is comprised between 0.1 and 80000 mL/min Bendtsen.

According to one embodiment, the microperforations on the external layer 15 are arranged in such a way that the air permeability of the external layer 15 is greater than the air permeability of the internal membrane 5. This feature promotes the extraction of the water and prevents the formation of condensation at the interface between the product and the internal membrane, especially for cheese products which have a high weight loss during maturation.

According to an alternative, the air permeability of the external layer 15 is smaller than the air permeability of the internal membrane 5.

The microperforations are of the same type as those formed on the internal layer plastic layer 7.

In one embodiment, the external layer 15 has areas having different densities of microperforations.

The density of microperforations in a given area on the internal plastic layer 7 is for example chosen in relation with the density of microperforations in an area on the external layer 15 facing the given area of the internal plastic layer 7. For example, the following types of relationships may be established: an area of the external layer 15 has the same density of microperforations as the facing area of the internal plastic layer 7, an area of the external layer 15 has no microperforations whereas the facing area of the internal plastic layer 7 has microperforations, an area of the external layer 15 has microperforations whereas the facing area of the internal plastic layer 7 has no microperforations and/or neither of the external layer 15 and the internal plastic layer 7 have microperforations. Choosing the density of microperforations of the external layer 15 as a function of that of the internal plastic layer 7 allows for an even better control of the flow of air and water through the packaging sheet from the cheese product to the environment. For example, in regions of a cheese packaging where at least two layers of packaging sheet are superimposed, facing areas of the external layer 15 and the internal plastic layer 7 are perforated in corresponding locations in order to improve the evacuation of the water vapor and compensate for the increased thickness of packaging sheet to be crossed by the water vapor due to the superposition of layers.

In an alternative, the microperforations form a regular pattern on the external layer 15. All the microperforations have a similar shape. All the microperforations are through-holes, i.e. they extend through the entire thickness of the external layer 15 and are open at both ends. These regular microperforations may for example be formed by means of a cylinder fitted with a plurality of identical needles arranged on the cylinder according to a regular pattern. In this alternative, the microperforations are therefore not randomly distributed.

Advantageously, the external layer 15 is made of a plastic material, chosen among the materials listed above in relation with the internal plastic layer 7. According to an alternative, it is made of a cellulose-based material such as paper.

According to another embodiment, the external layer 15 is made of aluminium.

According to an alternative of the first embodiment, the external layer 15 does not have any perforations or holes. In this case, the air permeability of the external layer 15 is equal to zero. According to this alternative, the air permeability of the external layer 15 is thus smaller than that of the internal membrane 5.

Advantageously, both the external layer 15 and the internal plastic layer 7 are made of a plastic material derived from renewable sources, for example PLA or PHB.

Figure 4:
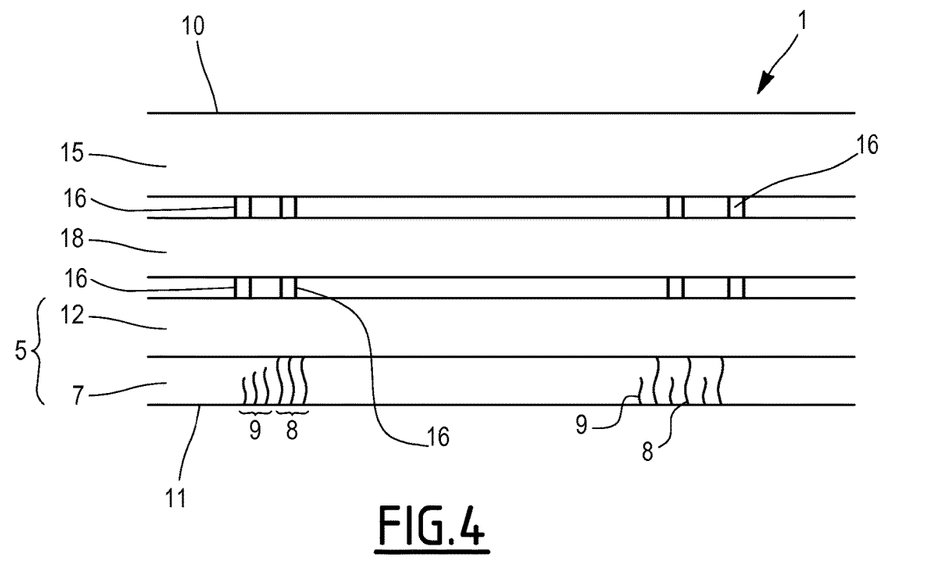
FIGS. 4 to 6 are diagrammatic cross-sections of a packaging sheet according to second, third and fourth embodiments of the invention.

The packaging sheet according to a second embodiment, illustrated on FIG. 4, differs from that according to the first embodiment only in that it further comprises a second water-absorbing layer 18 made of a second water-absorbing material superimposed onto the internal membrane 5. The second water-absorbing layer 18 is at least partially bonded to the first water absorbing layer 12. The second water-absorbing material is for example a cellulose-based material, such as cellulose film or paper. Advantageously, the second water-absorbing layer 18 is a layer of paper. The second paper layer 18 for example has a grammage of 20 to 40 g, and in particular a grammage comprised between 21 and 25 g.

In this embodiment, the first paper layer 12 may therefore have a grammage comprised between 22 and 40 g. The grammage of the first paper layer 12 is in particular equal to 22, 32 or 40 g.

The second water-absorbing layer 18 is arranged between the external layer 15 and the internal membrane 5.

Figure 5:
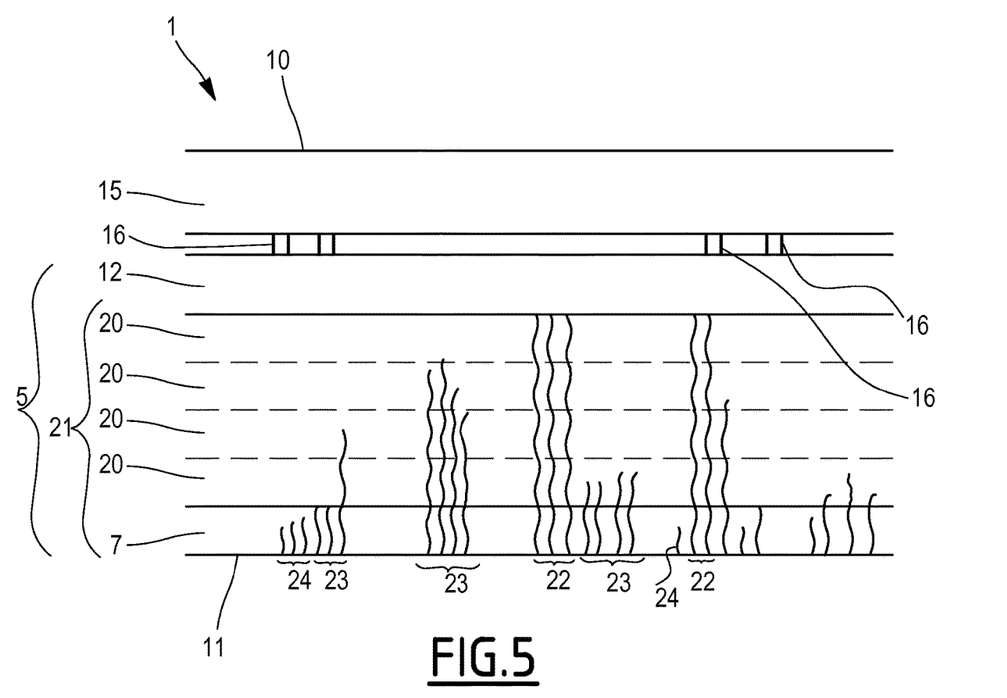

The packaging sheet according to a third embodiment, illustrated on FIG. 5, differs from that according to the first and second embodiments only in that the internal membrane 5 comprises at least two superimposed internal plastic layers 7, 20 forming a set 21 of internal plastic layers. The set 21 of internal plastic layers comprises microperforations. These microperforations and their distribution on the set 21 of internal plastic layers are of the same type as those described above with respect to the first internal layer 7 of the first embodiment. Some microperforations 22 extend through all the internal plastic layers 7, 20. Some microperforations 23 are blind holes and extend only through one or some of the internal plastic layers 7, 20. Other microperforations 24 extend only through a portion of the thickness of the innermost internal layer 7. All the microperforations 22, 23, 24 open on the internal surface 11 of the innermost internal plastic layer 7. The microperforations 22 also open on the outer surface of the outermost internal layer 20. The microperforations 23 have a length comprised between the thickness of the innermost internal plastic layer 7 and the total thickness of the set of internal plastic layers 7, 20. The microperforations 22 have a length equal to the total thickness of the set of internal plastic layers 7, 20. In the preceding, the length is the dimension of the microperforations in the direction perpendicular to the planes of the internal plastic layers 7, 20 and the thickness of the layers is their dimension in the direction perpendicular to the planes of the internal plastic layers 7, 20. Thus, each internal plastic layer 7, 20 comprises microperforations.

Figure 6:
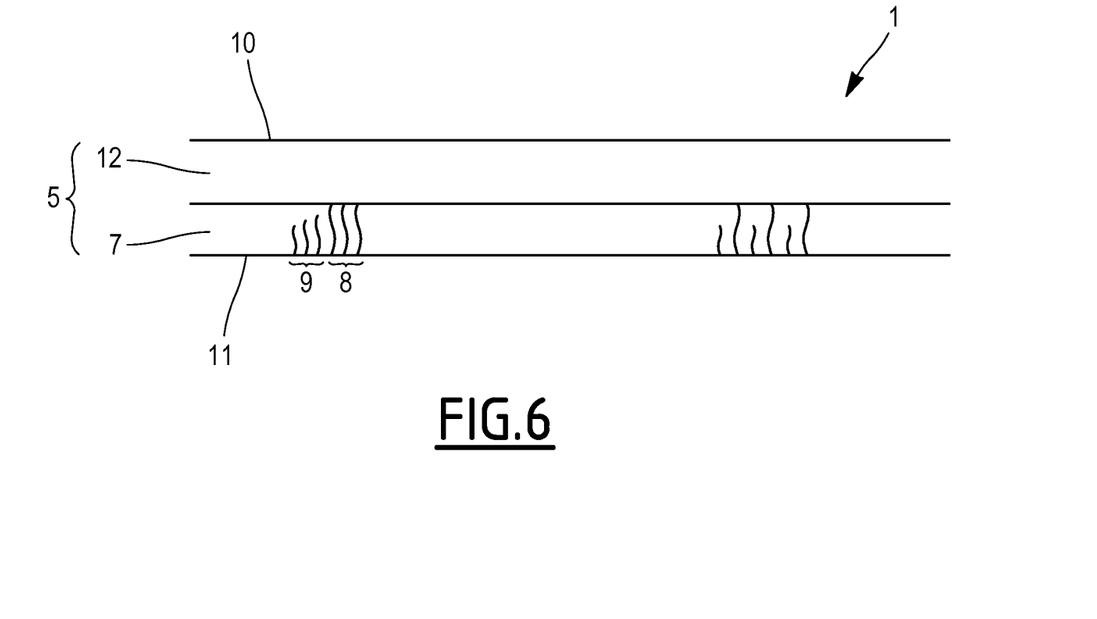

The packaging sheet 1 according to a fourth embodiment, illustrated on FIG. 6, differs from those according to the first, second and third embodiments only in that it does not comprise an external layer 15 or a second water-absorbing layer 18. In the fourth embodiment, the packaging sheet 1 consists of the internal membrane 5. The external surface 10 is formed by the outer surface of the internal membrane 5, i.e. by the outer surface of first water-absorbing layer 12. A layer of varnish and/or ink (not shown) may be applied onto the external surface 10.

According to a particular embodiment of the fourth embodiment, the internal membrane 5 consists of the internal plastic layers 7, 20 described with respect to the second embodiment. In this particular embodiment, at least one of the internal plastic layers 7, 20 is made of a water-absorbing plastic material.

Figure 7:
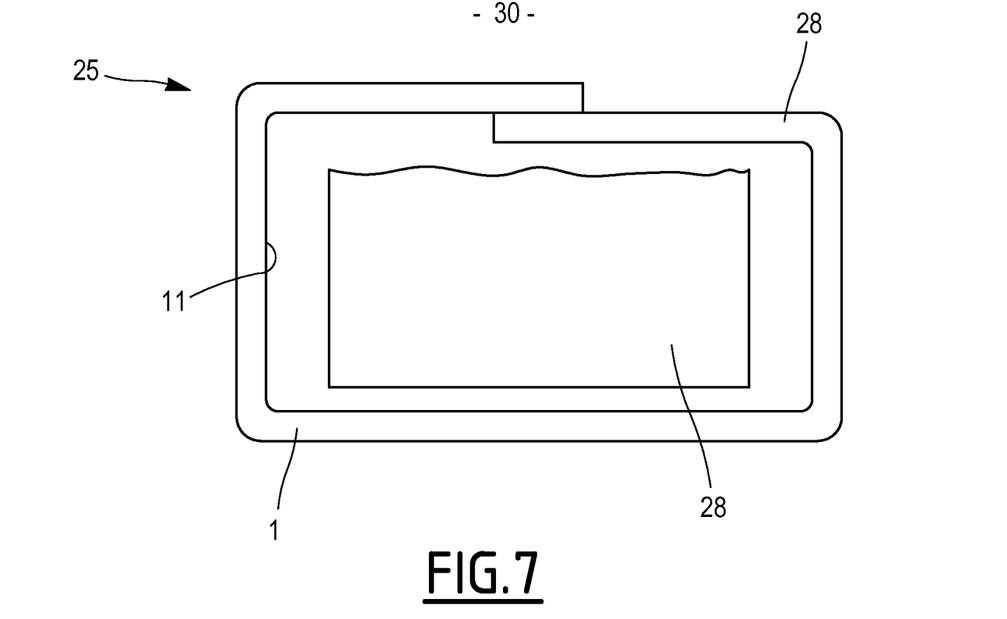
FIG. 7 is a diagrammatic view of a packaging according to the invention.

The invention also relates to a packaging 25, illustrated diagrammatically on FIG. 7, comprising a packaging sheet 1 as described above and a food product 28, in particular a cheese product. The food product 28 is wrapped in the packaging sheet 1 in such a way that the internal surface 11 of the internal membrane 5 faces, or is even in contact with, the food product 28. The food product 28 is wrapped in the packaging sheet 1 in such a way that all the exchanges of air and water between the food product 28, in particular the cheese product, and the environment 30 surrounding the packaging 25 take place through the packaging sheet 1, and are therefore regulated by the packaging sheet 1.

A method for manufacturing the packaging sheet 1 described above will now be described. This method comprises the following successive steps:
  providing the internal membrane 5; and
  forming the microperforations on the or each internal plastic layer 7.

More specifically, when manufacturing the packaging sheet 1 according to the first embodiment, the step of providing the internal membrane 5 comprises the steps of:
  providing the first water-absorbing layer 12;
  extruding plastic material onto the first water-absorbing layer 12 in order to form the or each internal plastic layer 7; and
  treating the or each internal plastic layer 7 with a suitable tool in order to form the microperforations.

The method further comprises a step of providing an external layer 15 which can take place simultaneously with the previously described steps.

The method further comprises a step of at least partially bonding the external layer 15 to the internal membrane 5 obtained at the end of the treatment step. The bonding step involves spraying or coating the adhesive onto one or both of the surfaces of the internal membrane 5 and of the external layer 15 intended to be bonded to one another so as to form lines, points, graphic symbols.

In the alternative where the external layer 15 is bonded to the entire outer surface of the internal membrane 5, the bonding step involves applying the adhesive to the entire surfaces of the internal membrane 5 and/or external layer 15 facing each other by means of spraying or coating. In another embodiment, the bonding step involves extrusion laminating a layer of resin, for example of polyethylene, onto at least one of the facing surfaces of the internal membrane 5 and of the external layer 15. In this alternative, the external layer 15 may also be extruded directly onto the internal membrane 5, in which case the step of forming the external layer 15 comprises the step of bonding the internal membrane 5 to the external layer 15. In this case, if present, the microperforations are formed on the external layer 15 after it has been extruded onto the internal membrane 5.

The bonding step takes place before or after the treatment step of the internal plastic layer.

According to an alternative, the or each internal plastic layer 7 is formed separately from the first water-absorbing layer 12 and is then bonded to the first water-absorbing layer 12 before forming the microperforations 8, 9 in the or each internal plastic layer 7.

The method for manufacturing the packaging sheet according to the second embodiment differs from that according to the first embodiment only in that it comprises a step of adhering the second water-absorbing layer 18 to the first water-absorbing layer 12 following the step of forming the or each internal plastic layer 7 and the microperforations 8, 9 in the or each internal plastic layer 7.

The method for manufacturing the packaging sheet according to the fourth embodiment differs from that for manufacturing the packaging sheet according to the first, second or third embodiment only in that it does not comprise the step of bonding the external layer 15 to the internal membrane 5.

In addition to the advantages listed in the above description, the packaging sheet also brings about the following advantages.

Due to the good control of the flow of fluid through the packaging sheet achieved with the packaging sheet according to the invention, the paper is not creased.

In the packaging sheets of the prior art, which comprised an internal layer of paraffin, the paper was coloured by the absorption of the water which has previously passed through the paraffin. This staining can be avoided in the packaging sheet according to the invention due to the absence of paraffin. Thus, the paper stays white.

Furthermore, the packaging sheet according to the invention slows the maturation process, which leads to a prolonged conservation time of the cheese as compared to a cheese packaged in known packaging sheets of the prior art for certain types of cheeses, for example certain types of soft-cheeses.

Moreover, the packaging sheet according to the invention does not stick to the cheese.

Finally, the internal plastic layers do not stick to the machines during manufacturing of the packaging sheet. This is not true when paraffin is used as the innermost layer as in the prior art.

The invention claimed is:

1. Packaging sheet intended for packaging a food product, the packaging sheet comprising:
  an internal membrane comprising at least one internal plastic layer intended to be oriented towards the product to be packaged and a first water-absorbing layer made of a first water-absorbing material; and
  an external layer at least partially bonded to the internal membrane and the external layer has microperforations arranged in a random fashion,
  a printable external surface formed by a surface of the external layer, the external surface being intended to be oriented away from the product to be packaged, wherein the or each internal plastic layer has a plurality of microperforations arranged in a random fashion on the or each internal plastic layer in such a manner that the air permeability of the internal membrane is comprised between 15 mL/min Bendtsen and 200 mL/min Bendtsen, measured using the method disclosed in the international standard ISO 5636-3, and the air permeability of the external layer is lower than the air permeability of the internal membrane, the at least one internal plastic layer and the external layer both consist of a plastic material, the density of microperforations on an internal surface of the internal plastic layer being higher than 1500 microperforations per $dm^2$, and the plurality of microperforations including through-holes that extend through the entire thickness of the at least one internal plastic layer and blind-holes whose length is smaller than the thickness of the at least one internal plastic layer, the blind-holes being arranged in a random fashion.

2. Packaging sheet according to claim 1, wherein the internal membrane comprises at least two superimposed internal plastic layers.

3. Packaging sheet according to claim 1, further comprising a second water-absorbing layer made of a second water-absorbing material superimposed on the first water-absorbing layer.

4. Packaging sheet according to claim 3, wherein the first and/or the second water-absorbing material is a cellulose-based material.

5. Packaging sheet according to claim 1, wherein the greatest dimension of the microperforations of the or each internal plastic layer in the plane of the internal plastic layer is comprised between 10 and 500 µm.

6. Packaging sheet according to claim 1, wherein the or each internal plastic layer has areas having different densities of microperforations.

7. Packaging sheet according to claim 1, wherein the or each internal plastic layer and the external layer have respective areas having different densities of microperforations.

8. Packaging comprising the packaging sheet according to claim 1, and a food product arranged in the packaging sheet in such a way that the internal plastic layer is oriented towards the food product.

9. Packaging according to claim 8, wherein the food product is a cheese product.

10. Packaging sheet according to claim 1, wherein an area of the external layer has the same density of microperforations as the facing area of the internal plastic layer.

11. Packaging sheet according to claim 1, wherein the food product is a cheese product.

12. Packaging sheet according to claim 1, wherein the through-holes and blind-holes allow for evacuation of water without sucking humidity from the food product.

13. Packaging sheet according to claim 1, wherein the plurality of microperforations in the internal plastic layer forms zones of reduced thickness, the zones of reduced thickness being zones of preferred water vapour passage.

* * * * *